(12) United States Patent
Kumagai

(10) Patent No.: US 6,314,274 B1
(45) Date of Patent: *Nov. 6, 2001

(54) PORTABLE RADIO HAVING RETRACTABLE KEYS, WHEREIN THE KEYS RETRACT WITHIN THE HOUSING UPON MOVEMENT OF A RETRACTION ACCUATOR

(75) Inventor: Keiichiro Kumagai, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,904

(22) Filed: Oct. 1, 1998

(30) Foreign Application Priority Data

| Oct. 1, 1997 | (JP) | 9-268813 |
| Jan. 14, 1998 | (JP) | 10-020335 |

(51) Int. Cl.⁷ .................................................. H04B 1/38
(52) U.S. Cl. ........................ 455/90; 361/680; 379/428; 455/348
(58) Field of Search ............................. 455/90, 575, 348, 455/347, 349; 379/428; 361/814, 679, 680

(56) References Cited

U.S. PATENT DOCUMENTS

| 5,602,715 | * | 2/1997 | Lempicki | 361/680 |
| 5,635,928 | * | 6/1997 | Takagi | 341/22 |
| 5,793,605 | * | 8/1998 | Sellers | 361/680 |
| 5,857,148 | * | 1/1999 | Weisshappel | 455/90 |
| 5,884,197 | * | 3/1999 | Ricardo | 455/575 |

FOREIGN PATENT DOCUMENTS

| 0 235 733 A1 | 9/1987 | (EP) . |
| Hei 5-95300 | 4/1993 | (JP) . |
| 5-48150 | 6/1993 | (JP) . |
| Hei 6-13253 | 2/1994 | (JP) . |
| 7-221823 | 8/1995 | (JP) . |
| 3043814 | 9/2000 | (JP) . |

* cited by examiner

Primary Examiner—Daniel Hunter
Assistant Examiner—Nick Corsaro
(74) Attorney, Agent, or Firm—Scully, Scott, Murphy & Presser

(57) ABSTRACT

A portable radio communication apparatus having a key protruding mechanism is disclosed. A key operation board has a plurality of keys mounted thereon, and the key operation board is moved such that the keys protrude from the housing when the apparatus is used and retract within the housing when the apparatus is not used.

21 Claims, 9 Drawing Sheets

PORTABLE RADIO HAVING RETRACTABLE KEYS, WHEREIN THE KEYS RETRACT WITHIN THE HOUSING UPON MOVEMENT OF A RETRACTION ACCUATOR

BACKGROUND OF THE INVENTION

1. Field of the Invention

The present invention relates to portable radio communication equipment and, more particularly to a portable radio communication apparatus having a key operation portion.

2. Description of the Related Art

In a conventional portable radio communication apparatus such as portable telephone equipment, a key operation portion from which the telephone number, etc. are input is provided on the surface of a lower housing. When an upper housing has been folded, the lower housing is covered by this upper housing. Also, the key operation portion is so disposed as not to protrude from the surface of the lower housing so that in a state where the upper housing has been folded no space may exist at a surface of contact between the upper and lower housings.

Since the key operation portion is difficult to operate unless this key operation portion protrudes from the surface of the housing, it is considered in view of the operating efficiency to provide a counterbore at around the key operation portion.

Another conventional portable radio telephone apparatus has been disclosed in Japanese Utility-model Unexamined Publication No. 3-105048. According to this conventional apparatus, in a state where an upper housing has been folded, some space exist at a surface of contact between the upper and lower housings so that the key operation portion is so disposed as to protrude from the surface of the lower housing.

However, portable telephone equipment tends to decrease in size year by year and so the key operation portion also becomes small in size. For this reason, mere provision of such counterbore results in making the key operation portion difficult to operate. Further, the space between the upper and lower housings increases the size of the telephone apparatus when it is folded.

SUMMARY OF THE INVENTION

An object of the present invention is to provide a portable radio communication apparatus that has solved the above-described problems and been improved.

Another object of the present invention is to provide a portable radio communication apparatus that allows easy operation.

Still another object of the present invention is to provide a portable radio communication apparatus that allows easy key operation without increasing in size.

According to the present invention, a portable radio communication apparatus includes a housing having a surface thereof, a key operation board having a plurality of keys mounted thereon, and a mechanism for moving the key operation board such that the keys protrude from the surface of the housing and retract within the housing. Therefore, the keys can protrude from the surface of the housing when the portable radio communication apparatus is used, resulting in improved operability of the keys.

The present invention can be applied to a foldable portable radio communication apparatus. According to this aspect of the present invention, a portable radio communication apparatus includes a first housing, a second housing having a surface thereof, and a hinge for permitting the first or second housing to be rotatably engaged therewith. The apparatus further include a key operation board provided in the second housing and having a plurality of keys mounted thereon, and a mechanism for moving the key operation board such that the keys are retracted within the second housing and are protruded from the surface of the second housing depending on a state of the first and second housings. Since the keys are retracted within the second housing and are protruded from the surface of the second housing depending on a state of the first and second housings, the keys can be protruded when the first and second housings are opened.

The present invention can be also applied to a single-body apparatus. According to this aspect of the present invention, a portable radio communication apparatus includes a housing having a plurality of openings formed in a surface thereof and a key operation board having a plurality of keys mounted thereon, wherein the keys are allowed to move through the openings, respectively. The apparatus further includes an energizing element for energizing the key operation board in such a direction that the keys retract within the openings and a mechanism for moving the key operation board such that the keys protrude from the first surface of the housing and retract within the housing.

DETAILED DESCRIPTION OF THE PREFERRED EMBODIMENTS

There will now be described in detail the present invention with reference to the accompanying drawings.

First Embodiment

Figure 1:
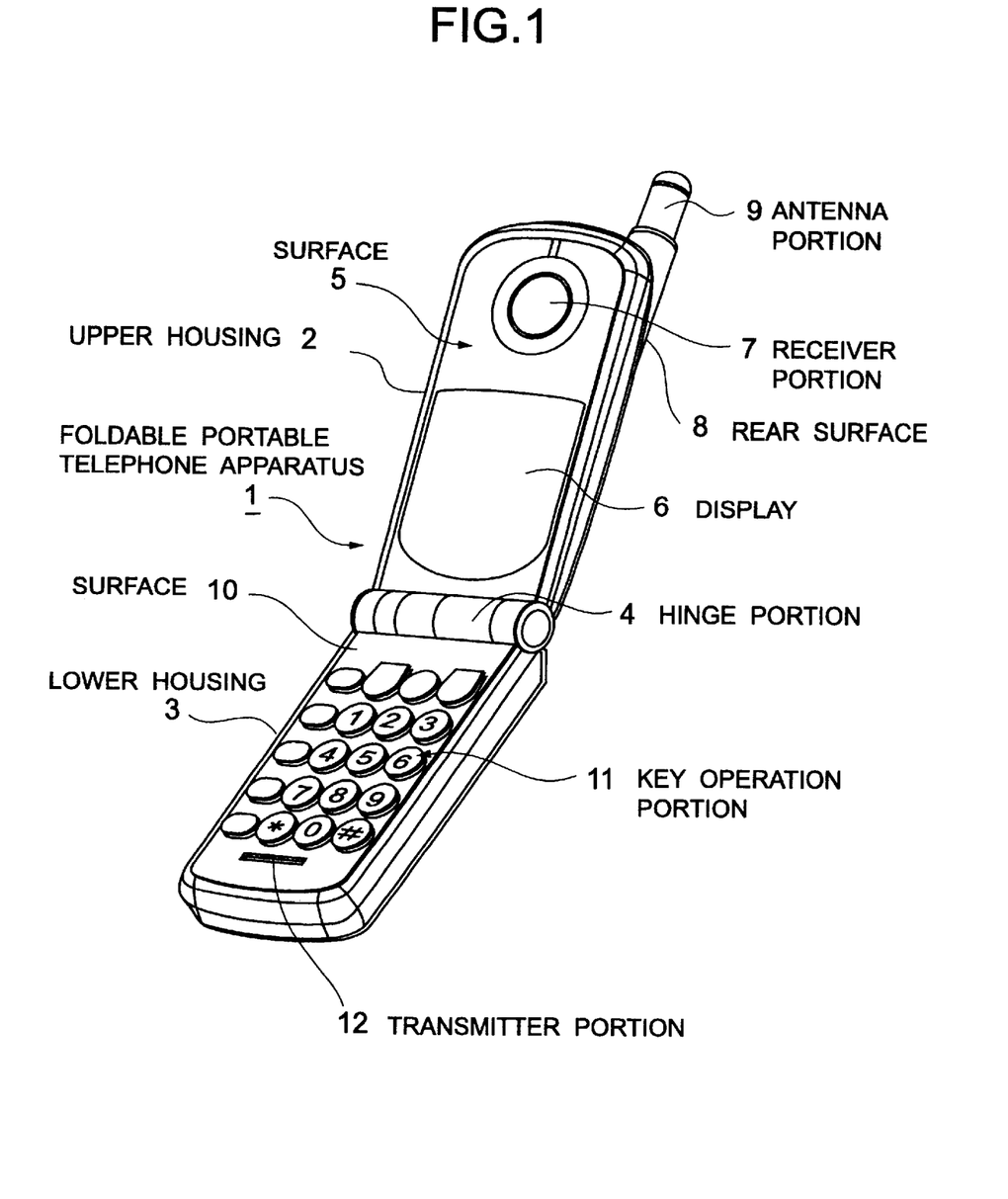
FIG. 1 is a perspective view illustrating a foldable portable-radio communication apparatus according to a first embodiment of the present invention.

Referring to FIG. 1, a foldable portable telephone apparatus is shown in the opened state and is constructed by being divided into an upper housing 2 that serves as a first housing and a lower housing 3 that serves as a second housing. The upper housing 2 and lower housing 3 are rotatably connected to each other by a hinge portion 4. Accordingly, the upper housing 2 and lower housing 3 are rotatable about the hinge portion 4.

On a surface 5 of the upper housing 2, i.e., on the surface 5 thereof which in the state where the apparatus 1 is folded up contacts with the lower housing 3, there are provided a display 6 and a telephone receiver portion 7 containing a speaker therein. The display 6 is a means for informing a user of various information. On a surface opposite to the surface 5 of the upper housing 2, namely a back surface 8 thereof, there is formed an antenna portion 9 for making its transmission/reception of radio communication waves to and from a base station or parent apparatus not illustrated.

On the other hand, on a surface 10 of the lower housing 3, i.e., on the surface thereof which contacts with the surface 5 of the upper housing 2, there are formed a key operation portion 11 and a telephone transmitter portion 12 containing a microphone. The key operation portion 11 includes a ten-key pad for inputting the phone number of a called party, abbreviated dialing and function keys for performing various functions. As illustrated, the key operation portion 11 is in the state of its being protruded when the foldable portable telephone apparatus 1 is opened. Through the protrusion of each of such keys, it is possible to enhance the operating efficiency while maintaining the device to be miniaturized.

As apparent from FIG. 1, it is preferable to make the outer configuration of each numerical key of the ten-key pad different from that of the other function keys. For example, the ten keys can be circular and the other function keys may be elliptic in configuration. Through the difference in configuration therebetween, it is possible to enhance further the operating efficiency.

Next, a detailed explanation will be given of a preferred embodiment of a mechanism for protruding the key operation portion of the present invention and the operation thereof.

Figure 2:
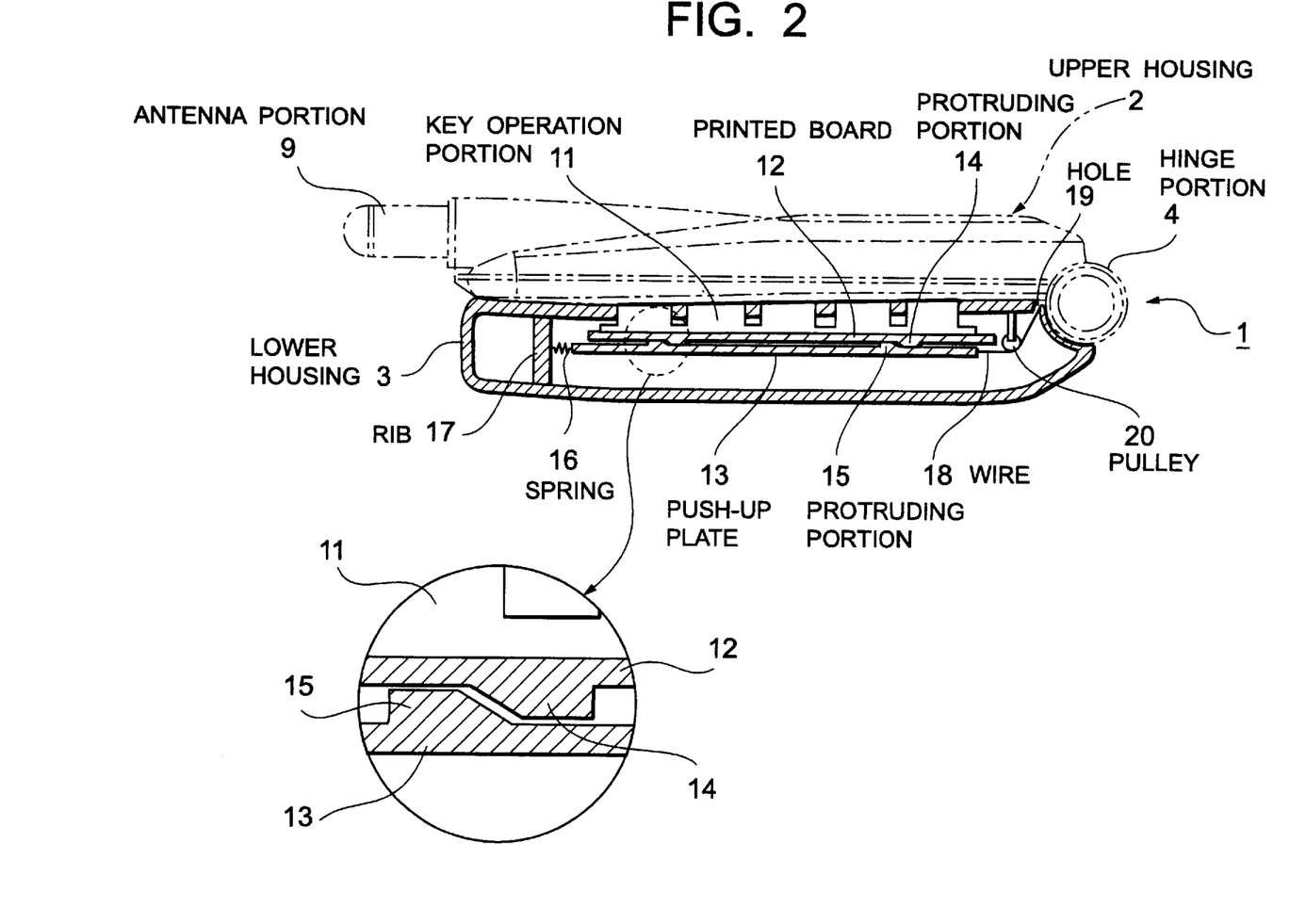
FIG. 2 is a sectional view illustrating the lower housing in the state where the foldable portable communication apparatus as illustrated in FIG. 1 is folded up.
Figure 3:
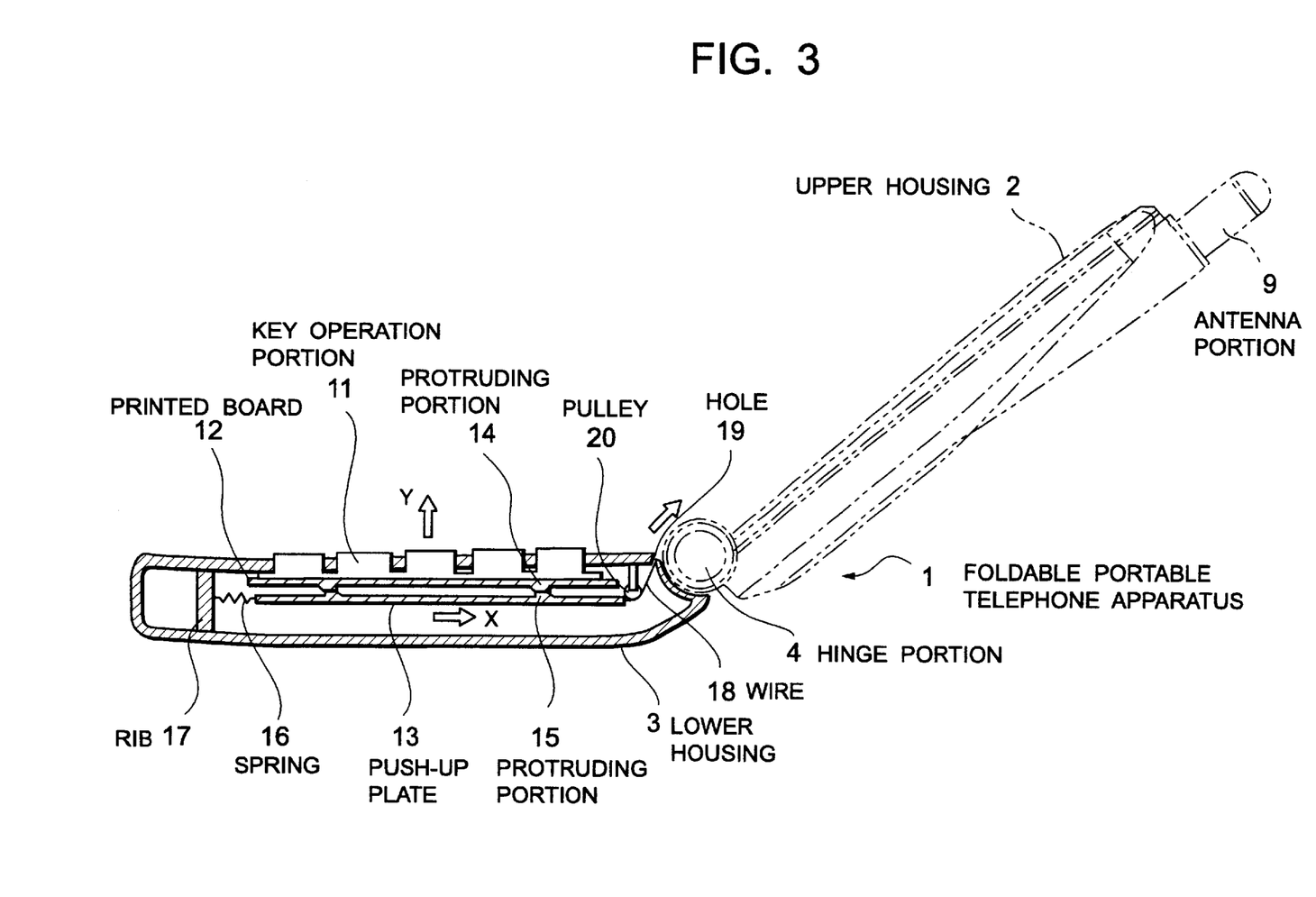
FIG. 3 is a sectional view illustrating the lower housing in the state where the foldable portable communication apparatus as illustrated in FIG. 1 is opened.

FIGS. 2 and 3 are sectional views illustrating respectively the lower housing 3 in the state where the foldable portable telephone apparatus 1 illustrated in FIG. 1 is folded up and that in the state where this device 1 is opened. As apparent from these drawings, it is seen that in the closed state the key operation portion 11 is retracted to within the lower housing 3 and in the opened state this key operation portion 11 is protruded from the lower housing 3.

First, in FIG. 2, the surface 10 of the lower housing 3 has formed therein holes from which respective keys of the key operation portion 11 are exposed. In the opened state, the keys of the key operation portion 11 are protruded from these holes as shown in FIG. 3.

The key operation portion 11 is disposed on one surface of a printed board 12 and, on the other surface side thereof, a push-up plate 13 is disposed. On the other surface of the printed board 12 there is formed at least one protruding portion 14, preferably two protruding portions and, on the surface on the printed board 12 side of the push-up plate 13 there is formed at least one protruding portion 15, or preferably two protruding portions. As will be described later, through the sliding movement of the push-up plate 13 in parallel with the printed board 12, the protruding portion 15 of the push-up plate 13 pushes up the protruding portion 14 of the printed board 12, whereby the key operation portion 11 is protruded from the surface 10 of the lower housing 3 as shown in FIG. 3.

In order to prevent the push-up plate 13 from being moved toward a back surface side of the lower housing 3, it is preferable to provide a holding member for holding the push-up plate 13 on a back surface of the push-up plate 13. It is further preferable to dispose the portions necessary for the foldable portable telephone apparatus on the back surface of the push-up plate 13 and thereby prevent the movement of the push-up plate toward the back surface side thereof. As a result of this, it is possible to make it unnecessary to use holding members dedicated to holding the push-up plate 13.

The side surface on the hinge portion 4 side of the protruding portion 14 is preferably substantially normal to the printed board 12 and the side surface on the opposite side to the hinge portion 4 of the protruding portion 14 preferably defines an obtuse angle as illustrated. Similarly, the side surface on the opposite side to the hinge portion 4 of the protruding portion 15 preferably defines an obtuse angle as illustrated and the side surface on the hinge portion 4 side thereof is preferably substantially normal to the printed board 12. The printed board 12 and the push-up plate 13 are disposed so that in the state where the foldable portable telephone apparatus is closed the protruding portions 14 and 15 may be displaced in position from each other.

It is preferable to arrange so that sliding the push-up plate 13 may cause the printed board 12 to be smoothly pushed upward. Also, location of the obtuse angular portions of the both protruding portions 14 and 15 at their adjacent positions is preferable for miniaturization.

A spring 16 is secured to one end portion of the push-up plate 13 and the other end of the spring 16 is connected to a rib 17. Preferably, as illustrated, the rib 17 is retained between the surface 10 and back surface of the lower housing 3. The spring 16 is normally contracted. As will be described, when the apparatus 1 is closed, the spring 16 has a length as measured as its natural length.

A wire 18 is secured to the other end of the push-up plate 13 and the other end of this wire 18 is connected to a position of the hinge portion 4. A hole 19 for permitting the passage of the wire 18 therethrough is formed at the portion of connection between the hinge portion 4 and the lower housing 3. A pulley 20 is provided between the hinge portion 4 and the push-up plate 13. In the case where the apparatus 1 is closed, the upper surfaces of the respective keys of the key operation portion 11 are pressed by the surface 5 and display 6 of the upper housing 2 and are thereby made flush with the surface 10 of the lower housing 3.

Referring to FIG. 3, in the state where the foldable portable telephone apparatus 1 is opened, the wire 18 is pulled toward the hinge portion 4 side through the rotation of the hinge portion 4, whereby the push-up plate 13 is slid in an X direction against spring tension. Therefore, the protruding portions 15 and 14 press each other. However, since the push-up plate 13 is so retained (not illustrated) as not to move toward the back surface side, the printed board 12 is moved in a Y direction. At this time, the spring 16 is brought to a state of its being expanded.

It is preferable to set the respective lengths of the wire 18 and spring 16 and dispose the push-up plate 13 so that the respective top surfaces of the protruding portions 14 and 15 may be contacted with each other when the foldable portable telephone apparatus 1 is opened.

Next, the operation of the present invention will be explained with reference to FIGS. 2 and 3.

In the state where the foldable portable telephone apparatus 1 is closed, the respective constituent elements illustrated in FIG. 2 are maintained as they are illustrated. When opening the foldable portable telephone apparatus 1 as illustrated in FIG. 3, the hinge portion 4 is rotated. In correspondence with the rotation of this hinge portion 4, the wire 18 is pulled toward the hinge portion 4 side. When the wire 18 is pulled, the push-up plate 13 is slid in the X direction, whereby the protruding portion 15 of the push-up plate 13 pushes up the protruding portion 14 of the printed board 12. In correspondence therewith, the printed board 12 is pushed up in the Y direction, with the result that the keys of the key operation portion 11 are protruded from the surface 10 to the outside.

Since the keys of the key operation portion 11 are secured by the inner periphery of the holes in the surface 10, there is no possibility that the printed board 12 will be slid in the X direction along with the push-up plate 13. Accordingly, although no special mechanism for retaining the printed board 12 is needed, the printed board 12 may otherwise be retained so as not to be slid in the X direction.

While the push-up plate 13 is slid by the wire 18 toward the hinge portion 4 side, the push-up plate 13 is pulled by the restoring force of the spring 16 in a direction opposite to the X direction. Therefore, there is no possibility that the push-up plate 13 will be slid in the X direction to an extent that is larger than necessary.

When returning the foldable portable telephone apparatus 1 from its opened state to its closed state, since the hinge portion 4 is rotated in the direction of closing the upper housing 2, no pulling force comes to be applied to the wire 18. On the other hand, owing to the restoring force of the spring 16, the push-up plate 13 tends to return in the direction opposite to the X direction. Then, the protruding portions 14 and 15 are returned to their original mutually displaced positions, with the result that the printed board 12 is lowered in the direction opposite to the Y direction. As a result of this, the keys of the key operation portion 11 are retracted to within the lower housing 3 and are thereby brought into close contact with the surface 5 or display portion 6 of the upper housing 2.

Although it may be arranged to retract the keys of the key operation portion 11 to within the lower housing by pushing these keys by the surface 5 of the upper housing 2, in a case where the display 6 exists on the surface 5 of the upper housing 2, the display presses the keys and in consequence it is likely that the display is damaged or impaired. Therefore, it is preferable to retract the keys without pressing them by the upper housing.

The respective surfaces 5 and 10 of the upper housing 2 and lower housing 3 may be planar but, as illustrated in FIGS. 2 and 3, may be curvilinear. In this case, the apparatus 1 conforms more easily for the user.

For example, as illustrated in FIGS. 2 and 3, the surface 5 on the antenna portion 9 side of the upper housing 2 is caused to gently protrude toward the lower housing 3 side and, on the other hand, the surface 10 of the lower housing 3 is curved, at a side opposite to the side of the hinge portion 4, in conformity with the configuration of the upper housing 2. The top surfaces of the respective keys of the key operation portion 11 are inclined in conformity with the surface 10 of the lower housing 3 and the heights thereof also are changed in conformity therewith.

Figure 4:
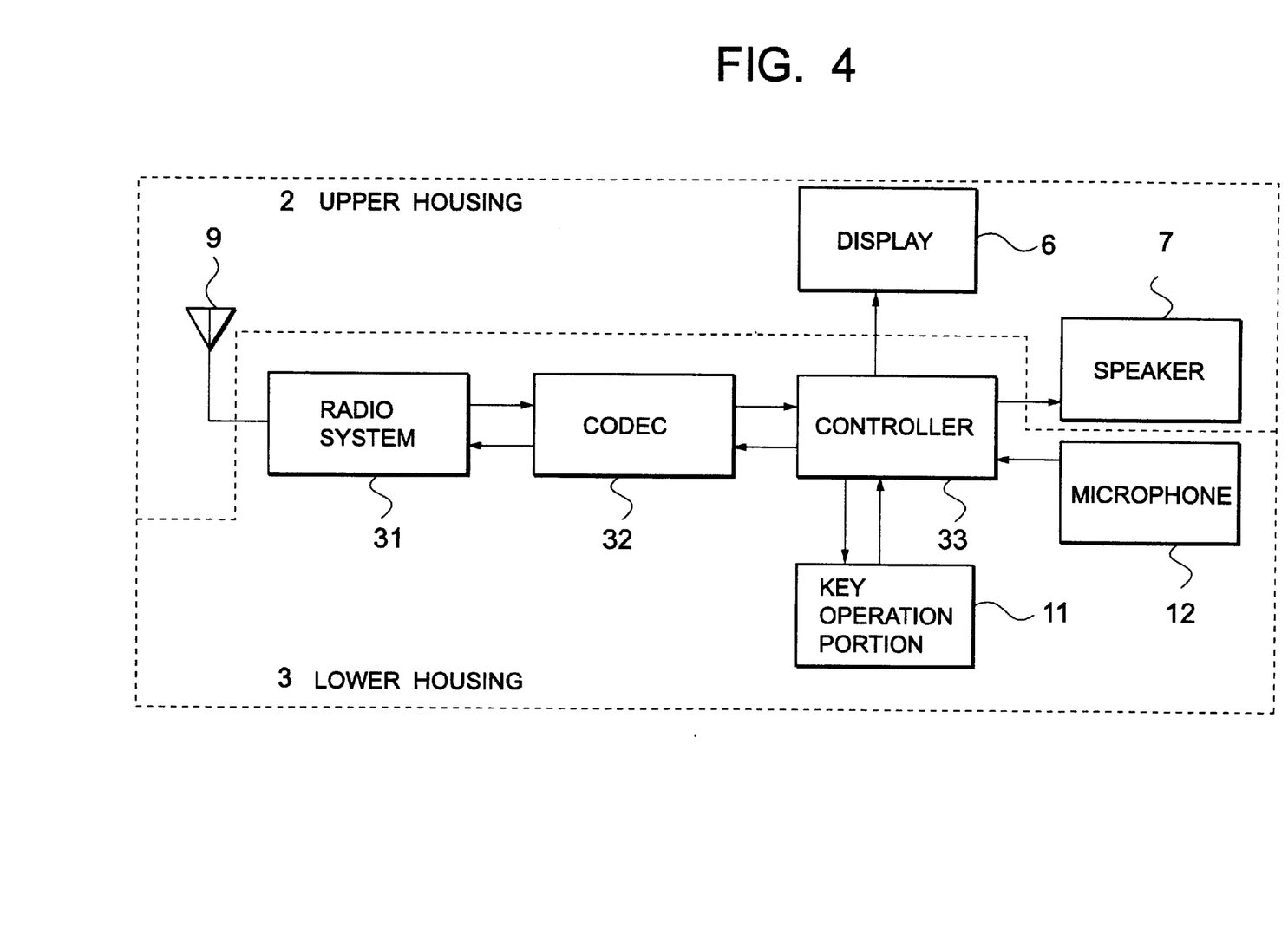
FIG. 4 is a block diagram illustrating the circuit configuration of the foldable portable communication apparatus according to the present invention.

Referring to FIG. 4, as described previously, the upper housing 2 has disposed thereon the display 6, telephone receiver portion 7 and antenna portion 9. The lower housing 3 has disposed therein the key operation portion 11, the telephone transmitter portion 12, a radio system 31, a coding/decoding portion (codec) 32 and a controller 33.

The radio system 31 inputs an intermediate-frequency (IF) coded signal from the coding/decoding portion 32 and converts it to radio-frequency (RF) signal, and then amplifies the RF signal to transmit it through the antenna portion 9. Also, the radio system 31 converts RF signal received by the antenna portion 9 to IF signal, amplifies it and then sends it to the coding/decoding portion 32. The coding/decoding portion 32 decodes the IF signal and sends the decoded signal to the controller 33. On the other hand, the coding/decoding portion 32 codes transmission signal received from the controller 33 and sends the coded signal to the radio system 31. As well known, the controller 33 has the function to control the respective circuit portions.

As described previously, the radio system, coding/decoding portion or controller is disposed between the back surface of the push-up plate 13 and the back surface of the lower housing 3 to thereby make it possible to prevent the movement of the push-up plate in the direction opposite to the Y direction. It is to be noted that although in the above-described embodiment the end portion of the wire has been secured to the hinge portion, the present invention is not limited thereto and, only if it is possible to slide the push-up plate toward the hinge portion side, this arrangement will sufficiently serve the purpose.

As described above, in the present embodiment, when the apparatus 1 is closed the surface of the keys and the surface of the lower housing are made substantially flush with each other. However, when the apparatus 1 is opened the surface of the keys is protruded from the surface of the lower housing, it is possible to enhance the key operating efficiency.

Further, since the opening operation causes the keys to be protruded from the surface 10 of the lower housing 3, it is possible to make the operation for protruding the keys unnecessary.

Also, although in the above-described embodiment an explanation has been given by the use of the foldable portable telephone apparatus, the present invention is not limited thereto and is also applicable to any portable communication device having a key operation portion as will be described hereinafter.

Second Embodiment

Figure 5:
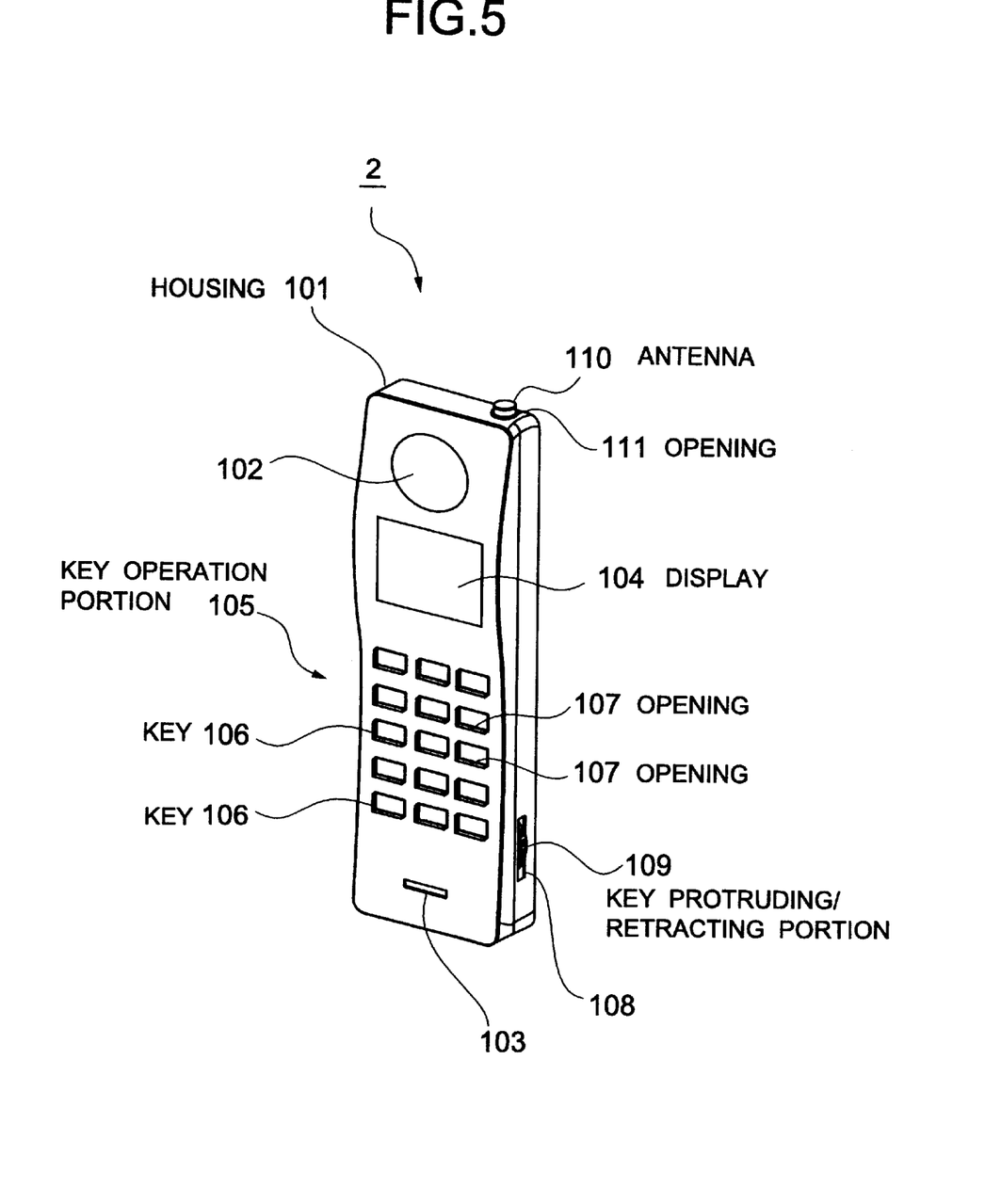
FIG. 5 is a perspective view illustrating a portable radio communication apparatus according to a second embodiment of the present invention.

As illustrated in FIG. 5, a portable telephone apparatus 2 according to a second embodiment of the present invention is comprised of a housing 101 having a telephone receiver portion 102 containing a speaker and a telephone transmitter portion 103 containing a microphone thereon. Further, the housing 101 has a display 104 such as a liquid-crystal display device and a key operation portion 105 having a plurality of keys 106 which can protrude through openings 107, respectively.

On the side surface of the housing 101, there is an opening 108 in which a key protruding/contracting portion 109 shaped like a toothed wheel is provided which is partly exposed to outside the housing 101. The teeth are formed in an outer periphery of the key protruding/retracting portion 109, whereby a rack-and-pinion mechanism is formed that will be described in detail later.

There is a rod-like antenna 110 accommodated in the housing 101. On the top surface of the housing 101, there is provided an opening 111 through which the antenna 110 can protrude and retract. The antenna 110 is supported within the housing 101 slidably in the longitudinal direction thereof and, when a telephone talk is done, is drawn out therefrom. Moreover, the antenna 110 is accommodated within the housing 101 in a state where the top end thereof is the same in height as the surface of the housing 101 or is retracted from the surface of the housing 101.

Figure 6A:
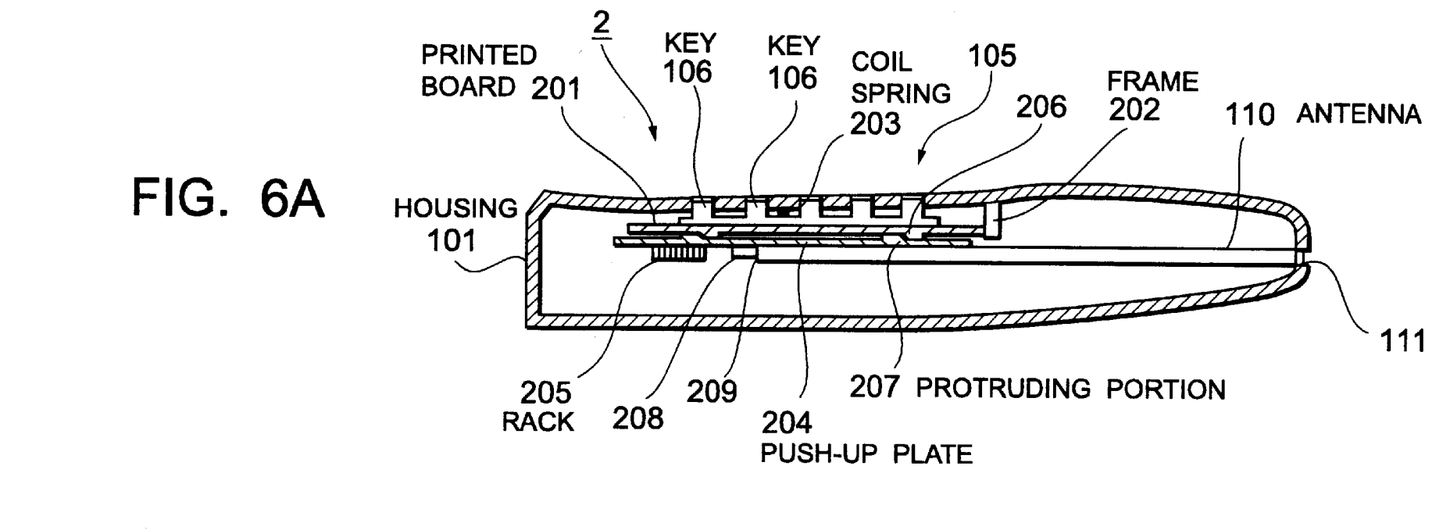
FIG. 6A is a sectional view illustrating the portable communication apparatus as illustrated in FIG. 5.
Figure 6B:
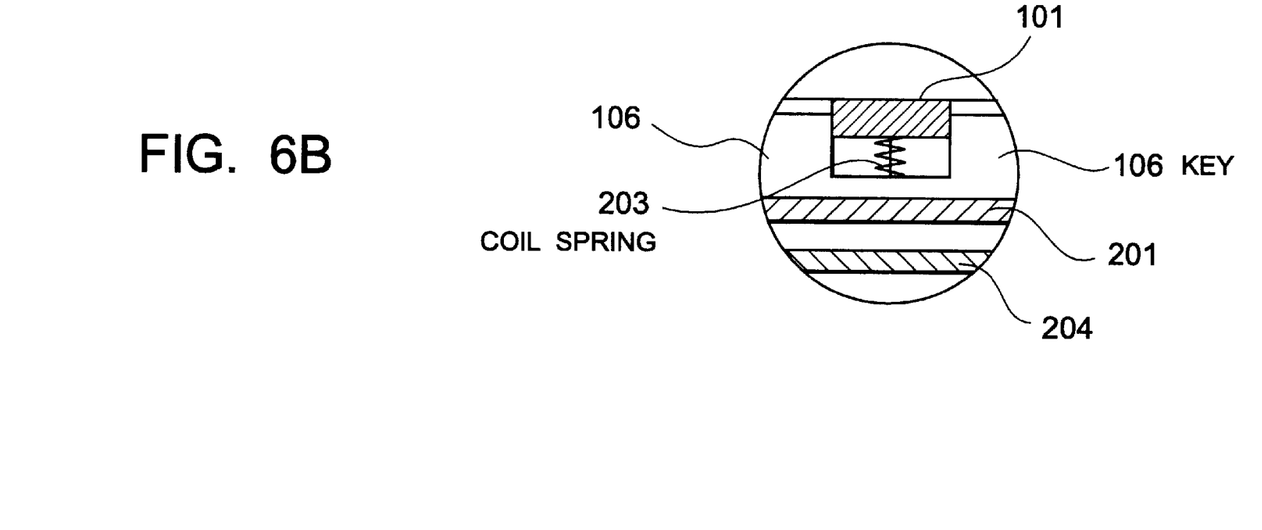
FIG. 6B is an enlarged sectional view illustrating an operation key portion of the portable communication apparatus as illustrated in FIG. 6A.

Referring to FIGS. 6A and 6B, the housing 101 is shaped like a rectangular parallelopiped box which contains a printed board 201 having an IC mounted thereon and the like. The operation keys 106 are mounted on the printed board 201 accommodated within the housing 101. The printed board 201 is accommodated within the housing 101 with extending in the longitudinal direction of the housing 101, accordingly in parallel with the extending direction of the antenna 110. The printed board 201 is placed inside a frame 202 which is a supporting means formed on an inner surface of the housing 101 by being protruded therefrom. The printed board 201 is supported by the frame 202 so that the printed board 201 may be movable in a direction substantially perpendicular to the surface of the printed board 201. Between the printed board 201 and the inner surface of the housing 101, as illustrated in detail in FIG. 6B, a coil spring 203 is disposed which extends in a direction perpendicular to the printed board 201. The printed board 201 is energized by the coil spring 203 in the direction of its being moved away from the inner surface of the housing 101. In other words, the keys 106 are energized in such a direction that the keys 106 retract.

On a back surface side of the printed board 201 there is disposed a push-up plate 204 in such a way that the surface thereof is located close to the back surface of the printed board 201 and the push-up plate 204 is substantially in parallel with the printed board 201. The push-up plate 204 is supported by a supporting means (not illustrated) so that the push-up plate 204 can be movable in the extending direction of the antenna 110, that is, in the extending direction of the surface of the push-up plate 204. It is to be noted that the movement of the push-up plate 204 in the direction perpendicular to the surface thereof is regulated.

Figure 8:
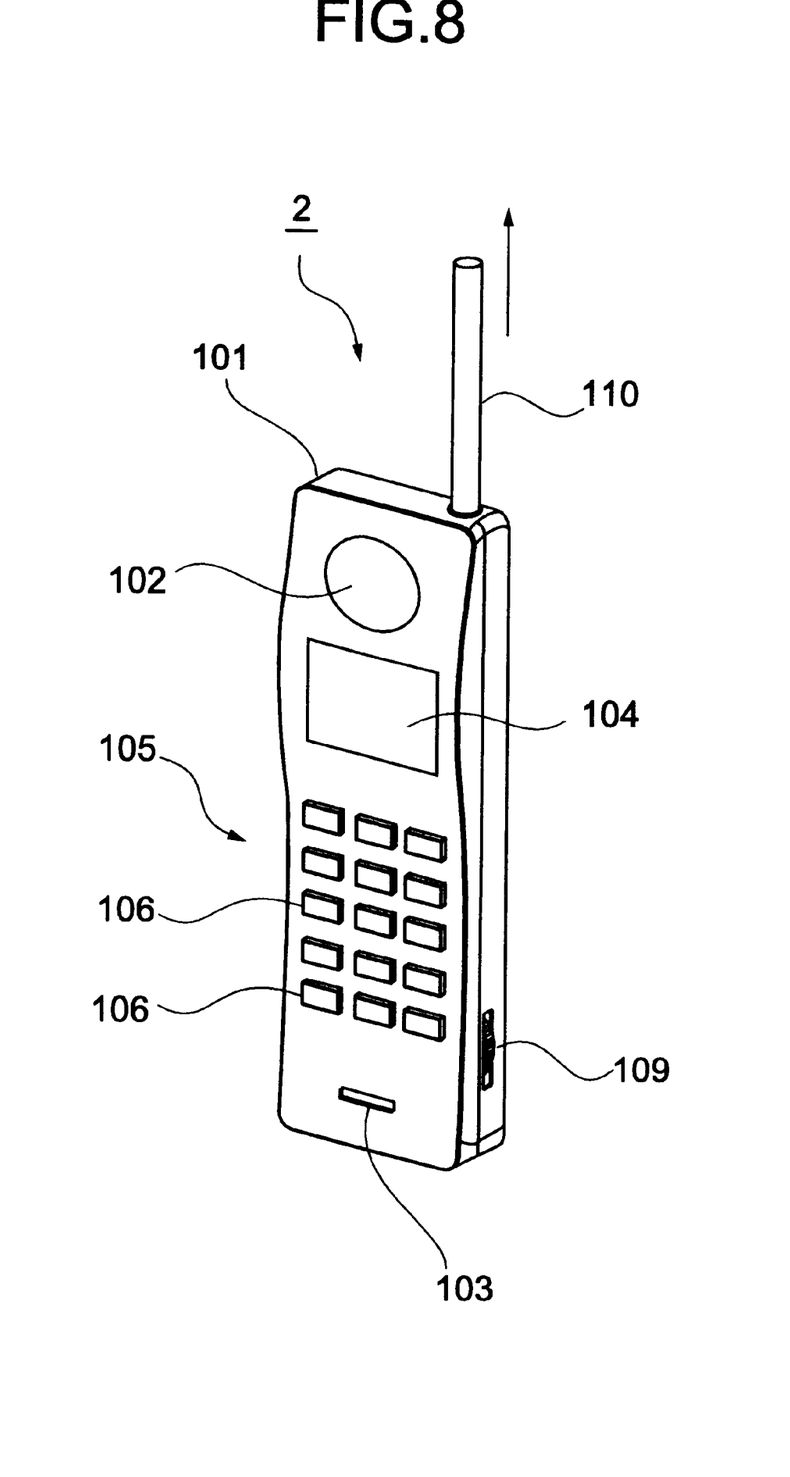
FIG. 8 is a perspective view illustrating the portable radio communication apparatus when it is used.
Figure 9:
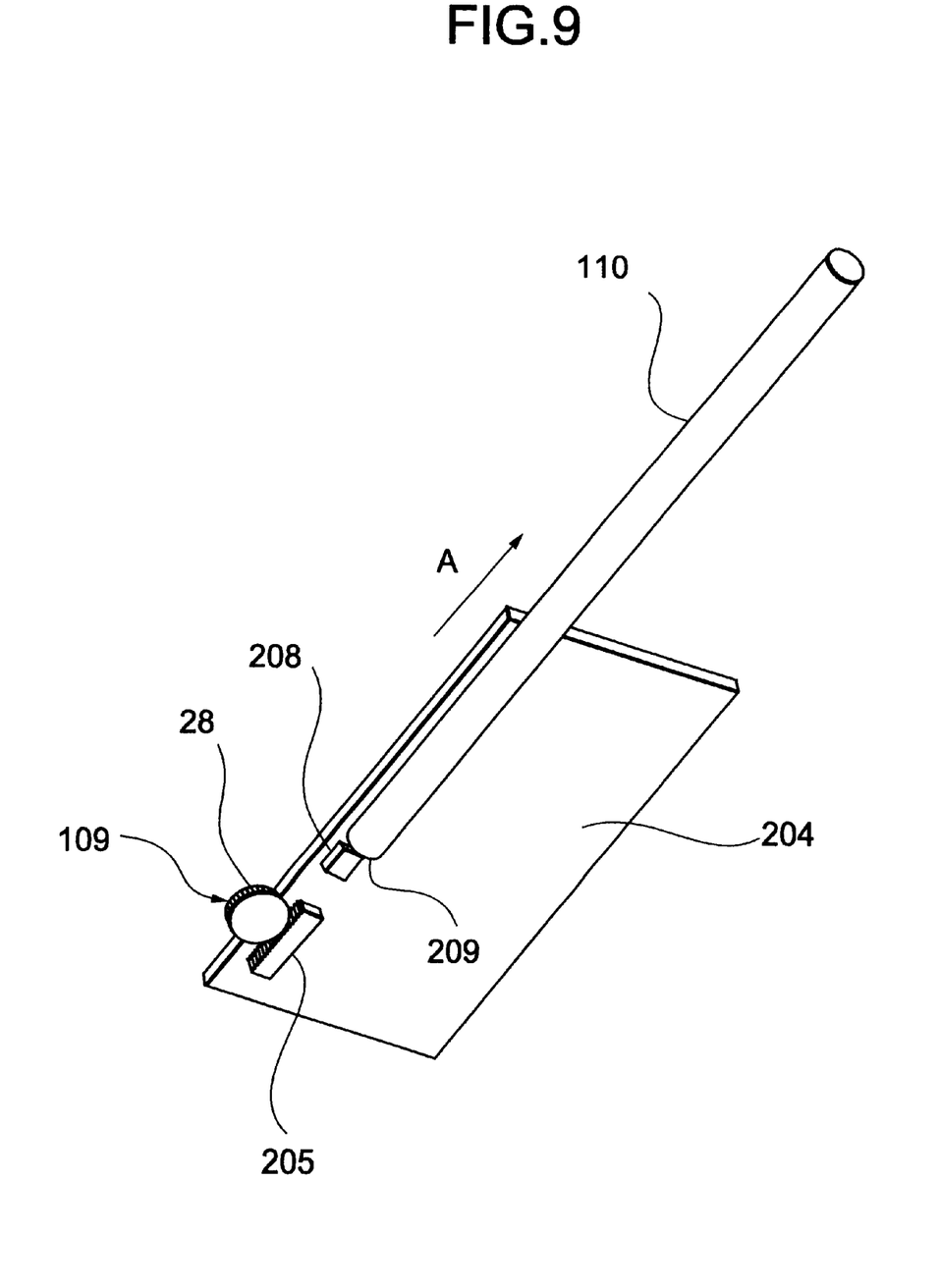
FIG. 9 is a perspective view illustrating an antenna extruding mechanism of the portable radio communication apparatus according to a second embodiment of the present invention.

On the other hand, on a back surface of the push-up plate 204 there is provided a rack 205 at a position in the extending direction of the antenna 110. The rack 205 serves as an interlocked portion with the key protruding/retracting portion 109. Teeth are formed in the rack 205 in the extending direction of the antenna 110 and the teeth are meshed with the key protruding/retracting portion 109. Furthermore, the key protruding/retracting portion 109 and the rack 205 constitute a rack-and-pinion mechanism as shown in FIG. 9, whereby upon application of a rotating force to the key protruding/retracting portion 109 this rotating force is converted by the rack 205 to a force that acts in the extending direction of the antenna 110 and is transmitted to the push-up plate 204 as shown in FIG. 8.

Also, a plurality of protruding portions 206 are formed on the back surface of the printed board 201 while, on the other hand, on the surface of the push-up plate 204 there are formed a plurality of protruding portions 207 that are engaged with the protruding portions 206 with the movement of the push-up plate 204 in the extending direction of the antenna 110. In this embodiment, these protruding portions 206 and 207 are formed substantially to the same height and the respective shapes thereof are about the same as the protruding portions 14 and 15 as shown in FIG. 2.

It is to be noted that the above-described push-up plate 204, rack 205 and protruding portions 206, 207 constitute a key protruding/retracting mechanism according to the present invention.

Further, on the back surface of the push-up plate 204 there is disposed a protruding portion 208 that abuts on a base end portion 209 of the antenna 110. Therefore, the movement of the push-up plate 204 causes the antenna 110 to extrude. As illustrated in FIG. 6A, in a state where the antenna 110 has been completely accommodated within the housing 101, the protruding portion 208 has its side portion kept substantially in abutment with the base end portion 209 of the antenna 110.

It is to be noted that the above-described push-up plate 204, the rack 205 and the protruding portion 209 constitute an antenna extruding mechanism.

Next, an explanation will be given of how the respective portions in the portable telephone apparatus 2 having the above-described construction are operated through the operation of the key protruding/retracting portion 109.

As illustrated in FIG. 6A, when bringing the portable telephone 2 to a state where the operation keys 8 and the antenna 110 are accommodated within the housing 101, the antenna 110 is intruded completely into the housing 101. As a result of this, the side portion of the protruding portion 208 is pressed by the base end portion 209 of the antenna 10, with the result that the push-up plate 204 is moved in the direction in which the antenna 110 is accommodated.

At this time, the respective positions of the protruding portions 206, 207 are displaced from each other. Moreover, since the printed board 201 is energized by the coil spring 203 in the inward direction of the housing 101, the printed board 201 is moved in the direction of its being moved away from the inner surface of the housing 101 until the protruding portions 206 and 207 come into contact with the push-up plate 204 and the printed board 201, respectively. As a result, the top ends of the respective operation keys 106 become substantially the same in height as the surface of the housing 101.

Accordingly, when, for example, accommodating the portable telephone 2 into a bag, it is possible to prevent the operation keys 106 from being erroneously operated and, in addition, since the antenna 110 is not protruded from the housing 101 at all, the antenna 110 does not become an obstacle and needs no space therefor.

Next, an explanation will be given of the operation for protruding the operation keys 106 and the antenna 110 from the housing 101.

Figure 7:
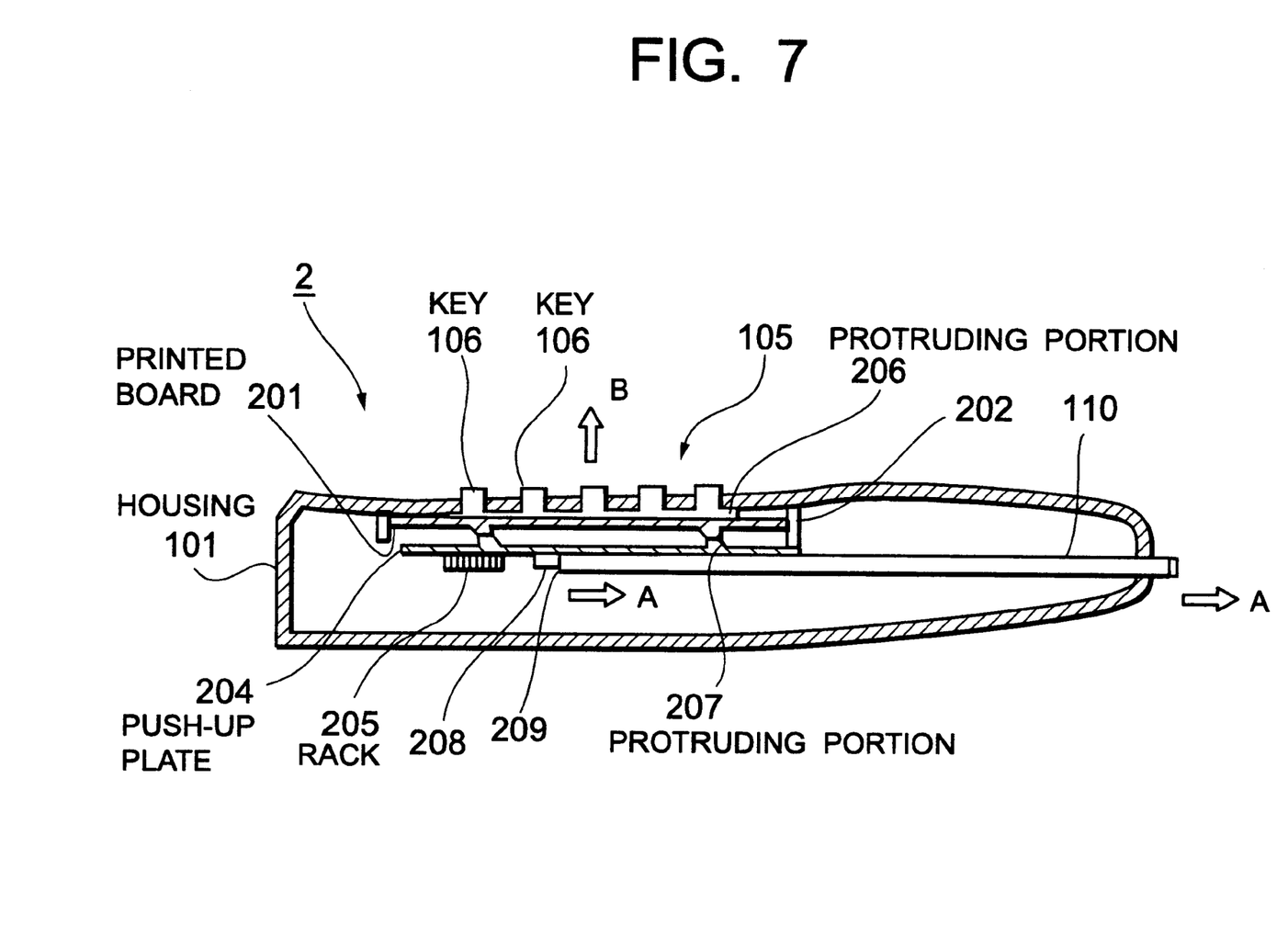
FIG. 7 is a sectional view illustrating the portable communication apparatus when the device is used.

As shown in FIG. 7, when rotating the key protruding/retracting portion 109 counterclockwise in a state where the apparatus 2 is viewed from the front surface side having the key operation portion 105 formed, a force is applied to the rack 205 in the direction indicated by an arrow A in which the antenna 110 is drawn out, with the result that the push-up plate 204 is moved in this direction. As a result of this, the protruding portion 207 formed on the surface of the push-up plate 204 is brought into engagement with the protruding portion 206 formed on the back surface of the printed board 201. This causes the protruding portion 206 to move upward, accordingly the printed board 201 to move in the direction indicated by an arrow B. As a result, the respective operation keys 106 mounted on the printed board 201 are protruded from their respective openings 107 to the outside of the housing 101. In this state, the respective operation keys 106 can be very easily operated.

On the other hand, through the movement of the push-up plate 204 made in the above-described way, the base end portion 209 of the antenna 110 is urged by the side portion of the protruding portion 208, whereby the antenna 110 is moved in its draw-out direction indicated by the arrow A. Consequently, since the top end of the antenna 110 is protruded from the housing 101, it is possible to easily draw out the antenna 110 to outside the housing 101 by clamping the top end thereof to thereby make the telephone 2 communicable as shown in FIG. 8.

Although the present invention has above been explained on the basis of the embodiments, such embodiments are only illustrative. The present invention is not limited to such embodiments and can be embodied in various forms.

For example, as the key protruding/retracting mechanism or antenna extruding mechanism, there can be adopted various other constructions therefor than those which are made up of the push-up plate 204, rack 205, protruding portions 206, 207 and 208, etc. as in the case of the present embodiment. Further, it is also possible to adopt a construction that uses a lever, instead of the disk-shaped key protruding/retracting portion 109.

Although in the above-described embodiment it has been explained that the protruding portions 206 and 207 are substantially the same in height, these portions may be different in height from each other.

Further, although here in the embodiment an explanation has been given by taking up a portable telephone as an example, the present invention is not limited thereto and can be applied also to various portable communication devices each equipped with operation keys and antenna.

As described above, according to the embodiment, when operating the key protruding/retracting portion and thereby rotating or moving it, the key protruding/retracting mechanism is interlocked with the key protruding/retracting portion to thereby move the printed board against the urging force of the spring in the direction in which this board moves toward the inner surface of the housing. As a result, the operation keys mounted on the printed board are protruded from the surface of the housing through the openings of the key operation portion. In this state, the operation keys can be very easily depressed and thereby so operated. For this reason, even if the portable communication apparatus is miniaturized, a good operating efficiency can be ensured.

When the key protruding/retracting portion is not operated, the key protruding/retracting mechanism is not operationally moved with the result that the printed board is kept moved by the urging force of the spring in the direction of its being moved away from the inner surface of the housing. Accordingly, the operation keys mounted on the printed board are brought to a state of their being retracted to within the openings. Therefore, when, for example, accommodating the portable communication device into a bag, it is possible to prevent the operation keys from being erroneously operated by bringing the portable communication device to such a state.

Also, even when this apparatus is made into a structure wherein the antenna is accommodated into the housing without being protruded therefrom, upon operation of the key protruding/retracting portion the antenna extruding mechanism causes the movement of the antenna to the outside of the housing in interlocking relationship with the key protruding/retracting portion. As a result, the antenna is protruded to outside the housing. Therefore, the antenna can be very easily drawn out to outside the housing by clamping the forward end thereof. In addition, when accommodating the antenna, the antenna is not protruded from the housing at all and therefore does not become an obstacle and needs no space therefor.

What is claimed is:

1. A portable radio communication apparatus comprising:
   a housing having an interior, and a surface thereof, said surface having a plurality of openings in communication with said interior;
   a key operation board having a plurality of keys mounted thereon, said key operation board housed within said interior of said housing wherein, said plurality of keys correspond to said plurality of openings;
   key operation board lifting means for lifting key operation board and forcing the plurality of keys from within the interior of the housing through the corresponding plurality of openings;
   key operation board lowering means for lowering the key operation board and for lowering the plurality of keys through the corresponding plurality of openings into the interior of the housing; and
   at least one actuation means for moving the key operation board lifting means in a first direction such that said key operation board lifting means forces the key operation board to move towards the plurality of openings in said housing causing said keys to protrude from the surface of the housing through said openings, and for moving said key operation board lifting means in a second direction such that said key operation lowering means causes the key operation board to be lowered and said keys to retract into the interior of the housing.

2. The portable radio communication apparatus according to claim 1, wherein the mechanism comprises:
   a movable element for moving between a first position and a second position; and
   a converter for converting movement of the movable element to that of the key operation board.

3. The portable radio communication apparatus according to claim 2, wherein the movable element is a rotatable portion of the housing which is opened when the portable radio communication apparatus is used.

4. The portable radio communication apparatus according to claim 2, wherein the movable element is a rotatable disk which is provided in the housing such that the rotatable disk partly protrudes from a surface of the housing.

5. The portable radio communication apparatus according to claim 2, wherein the converter comprises:
   a first protruding portion of the movable element wherein the first protruding portion is directed toward the key operation board;
   a second protruding portion of the key operation board wherein the second protruding portion is directed toward the movable element,
   wherein the first and second protruding portions are displaced from each other when the movable element is located at the first position and top surfaces of the first and second protruding portions are faced with each other when the movable element is located at the second position.

6. The portable radio communication apparatus according to claim 5, wherein the first and second protruding portions are shaped like a trapezoid such that the first and second protruding portions are smoothly slid over each other and the top surfaces of the first and second protruding portions are substantially parallel to each other.

7. The portable radio communication apparatus according to claim 1, wherein the housing has a plurality of openings formed in the surface thereof, wherein the openings correspond to the keys which are allowed to move through the openings, respectively.

8. A portable radio communication apparatus comprising:
   a first housing;
   a second housing having an interior, and a surface thereof, said surface having a plurality of openings in communication with said interior;

a hinge for permitting the first or second housing to be rotatably engaged therewith;

a key operation board having a plurality of keys mounted thereon, said key operation board being housed within the second housing, said plurality of keys corresponding to said plurality of openings;

key operation board lifting means for lifting key operation board and forcing the plurality of keys from within the interior of the housing through the corresponding plurality of openings;

key operation board lowering means for lowering the key operation board and for lowering the plurality of keys through the corresponding plurality of openings into the interior of the housing; and at least one actuation means for moving the key operation board lifting means in a first direction such that said key operation board lifting means forces the key operation board to move towards the plurality of openings in said housing causing said keys to protrude from the surface of the second housing through said openings, and for moving said key operation board lifting means in a second direction such that said key operation lowering means causes the key operation board to be lowered and said keys to retract into the interior of the housing.

9. The portable radio communication apparatus according to claim 8, wherein the keys are retracted within the second housing when the first and second housings are in a closed state and are protruded from the surface of the second housing when the first and second housings are in opened state.

10. The portable radio communication apparatus according to claim 9, wherein the mechanism comprises:

a first plate element connected to the hinge at one end and connected to a spring at the other end to move in a longitudinal direction depending on the movement of the first and second housings, wherein the first plate element is provided with a first protruding portion; and a second plate element fixed to a back surface of the key operation board, wherein the second plate element is provided with a second protruding portion, wherein the first protruding portion is directed toward the second plate element and the second protruding portion is directed toward the first plate element, wherein the first and second protruding portions are displaced from each other when the first and second housings are in the closed state and top surfaces of the first and second protruding portions are faced with each other when the first and second housings are in the opened state.

11. The portable radio communication apparatus according to claim 10, wherein the first and second protruding portions are shaped like a trapezoid such that the first and second protruding portions are smoothly slid over each other and the top surfaces of the first and second protruding portions are substantially parallel to each other.

12. The portable radio communication apparatus according to claim 8, wherein the second housing has a plurality of openings formed in the surface thereof, wherein the openings correspond to the keys which are allowed to move through the openings, respectively.

13. A portable radio communication apparatus comprising:

a housing having an interior, and a plurality of openings formed in a surface thereof said openings being in communication with said interior;

a key operation board having a plurality of keys mounted thereon;

a key operation board having a plurality of keys mounted thereon, said key operation board being housed within the second housing, said plurality of keys corresponding to said plurality of openings;

key operation board lifting means for lifting key operation board and forcing the plurality of keys from within the interior of the housing through the corresponding plurality of openings;

an energizing element for energizing the key operation board in such a direction that the keys retract within the openings; and at least one actuation means for moving the key operation board lifting means in a first direction such that said key operation board lifting means forces the key operation board to move towards the plurality of openings in said housing causing said keys to protrude from the surface of the second housing through said openings, and for moving said key operation board lifting means in a second direction such that said energizing element causes the key operation board to be lowered and said keys to retract into the interior of the housing.

14. The portable radio communication apparatus according to claim 13, wherein the mechanism comprises:

a movable element for moving between a first position and a second position; and a converter for converting movement of the movable element to that of the key operation board.

15. The portable radio communication apparatus according to claim 14, wherein the movable element is a rotatable disk which is provided in the housing such that the rotatable disk partly protrudes from a surface of the housing.

16. The portable radio communication apparatus according to claim 15, wherein the converter comprises:

a first plate element coupled to the rotatable disk to move in a longitudinal direction depending on the movement of the rotatable disk, wherein the first plate element is provided with a first protruding portion; and a second plate element fixed to a back surface of the key operation board, wherein the second plate element is provided with a second protruding portion, wherein the first protruding portion is directed toward the second plate element and the second protruding portion is directed toward the first plate element, wherein the first and second protruding portions are displaced from each other when the rotatable disk is at the first position and top surfaces of the first and second protruding portions are faced with each other when the rotatable disk is at the second position.

17. The portable radio communication apparatus according to claim 13, further comprising:

an antenna provided within the housing and extendable from a top surface of the housing; and an antenna moving mechanism for moving the antenna interlocking with the key operation board such that a top portion of the antenna protrudes from the top surface of the housing.

18. The portable radio communication apparatus according to claim 17, wherein the mechanism comprises:

a movable element for moving between a first position and a second position;

a first converter for converting movement of the movable element to that of the key operation board; and a second converter for converting movement of the movable element to that of the antenna.

19. The portable radio communication apparatus according to claim 18, wherein the movable element is a rotatable disk which is provided in the housing such that the rotatable disk partly protrudes from a surface of the housing.

20. The portable radio communication apparatus according to claim 19, wherein the first converter comprises:

a first plate element coupled to the rotatable disk to move in a longitudinal direction depending on the movement of the rotatable disk, wherein the first plate element is provided with a first protruding portion; and a second plate element fixed to a back surface of the key operation board, wherein the second plate element is provided with a second protruding portion, wherein the first protruding portion is directed toward the second plate element and the second protruding portion is directed toward the first plate element, wherein the first and second protruding portions are displaced from each other when the rotatable disk is at the first position and top surfaces of the first and second protruding portions are faced with each other when the rotatable disk is at the second position.

21. A portable radio communication apparatus comprising:

a housing having an interior, and a surface thereof, said surface having a plurality of openings in communication with said interior;

a key operation board having a plurality of keys mounted thereon, said key operation board housed within said interior of said housing wherein, said plurality of keys correspond to said plurality of openings, said key operation board having on the side opposite the keys at least one protruding portion with a sloped surface;

a push up plate, said push up plate at least one protruding portion on a side facing the key operation board with a sloped surface opposing that of the protruding portion of the key operation board, a mechanism for moving the push up plate such that the two opposed sloped surfaces cause the keys to protrude from the surface of the housing upon movement of a push-up plate in a first direction, and retract within the housing upon movement of the push-up plate in a second direction, said movement is a second direction being assisted an energy storing means which had been activated by said movement in said first direction.

* * * * *